United States Patent Office 3,310,729
Patented Mar. 21, 1967

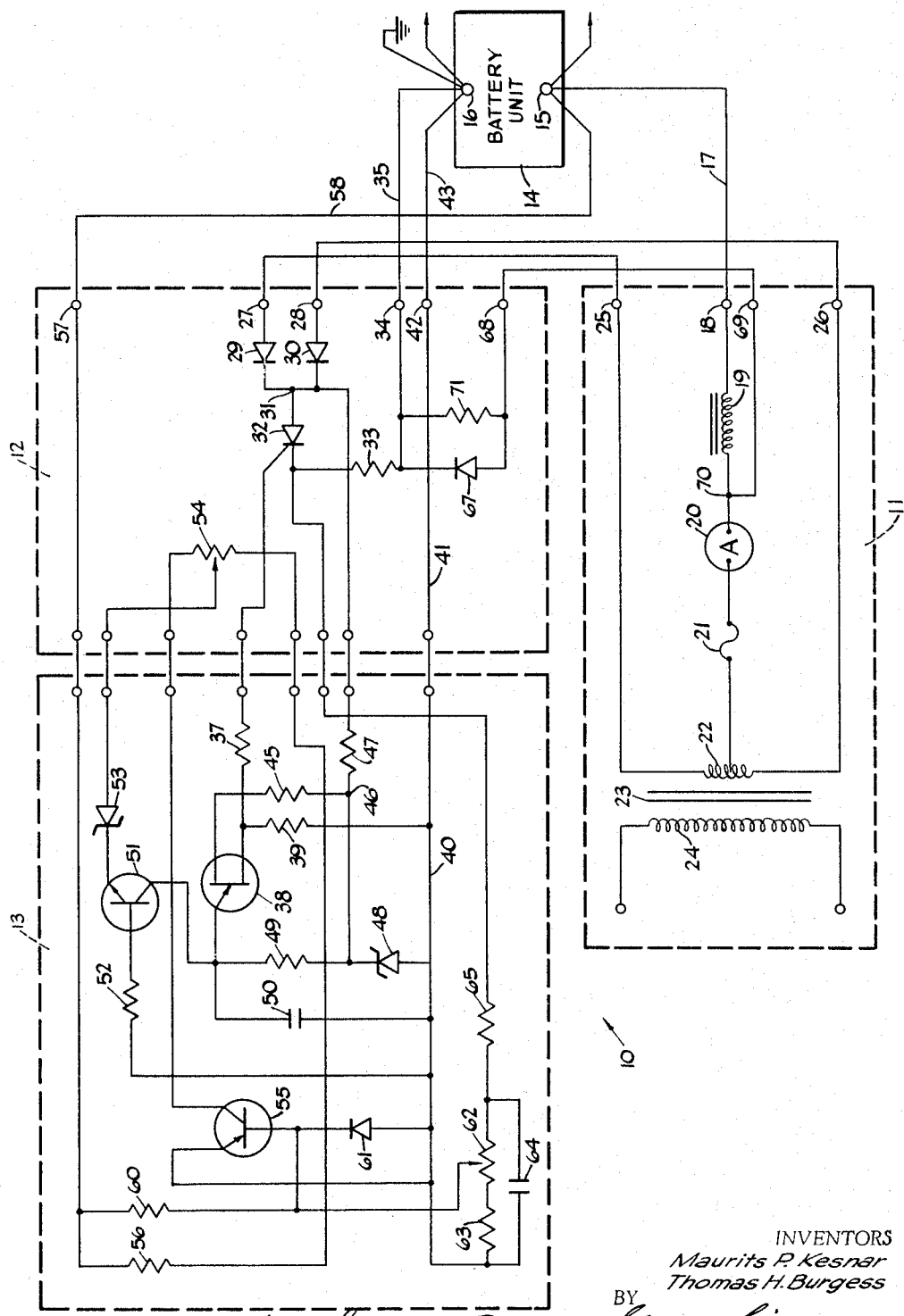

3,310,729
RECTIFIER CIRCUIT
Thomas Henry Burgess, Little Rock, Ark., and Maurits P. Kesnar, Granite City, Ill., assignors to Fan-Tron Corporation, Little Rock, Ark., a corporation of Arkansas
Filed Jan. 4, 1963, Ser. No. 266,769
(Filed under Rule 47(a) and 35 U.S.C. 116)
3 Claims. (Cl. 321—18)

This invention relates to a rectifier circuit and more particularly to a solid state rectifier circuit which is comparatively simple in construction and operation, using a minimum number of component parts, while being extremely rugged, reliable and efficient, producing a closely regulated output voltage with output current being limited to a desired maximum value.

The circuit of this invention was specifically designed for use in the conversion of thyratron rectifier circuits, used in battery charging or similar applications, to circuits using solid state devices to increase reliability and decrease maintenance and replacement expenses. It will be apparent, however, that the invention achieves many other advantages and that many features of the invention are not limited to such conversion use.

An important feature of the invention is in the use of a silicon controlled rectifier and in the control thereof to obtain accurate regulation of output voltage.

Another feature of the invention relates to a circuit for controlling a silicon controlled rectifier to limit output current to a desired maximum value.

A further feature of the invention relates to a circuit using a diode in conjunction with a filter choke and a silicon controlled rectifier in a manner to obtain highly efficient and reliable operation.

Still another feature of the invention relates to a circuit using a low value of resistance as a transducer in conjunction with a transistor and suitable diode (forward biased stabistor or reverse biased zener) as a reference element to achieve an adjustable current limit, thus preventing damage to the circuitry from operation in an overload condition.

Additional features of the invention relate to the provision of circuits interconnecting a unijunction transistor and a silicon controlled rectifier in a manner to obtain reliable operation without requiring the use of transformers or other expensive components.

The invention contemplates other objects, features and advantages which will become more fully apparent from the following detailed description taken in conjunction with the accompanying drawing in which the single figure illustrates a rectifier system according to the invention.

Reference numeral 10 generally designates a rectifier system constructed according to the principles of this invention. The illustrated system comprises portions of a Thyratron rectifier unit 11 and a solid state rectifier conversion unit 12 with a control unit 13 connected thereto. The Thyratrons and control circuitry therefore are removed from or disconnected within the unit 11, and are therefore not illustrated.

In general, the conversion of such Thyratron rectifier units with the solid state unit 12 and the control unit 13 produces higher reliability, greatly reduces replacement and maintenance expenses and with the circuit of this invention, provides a much better voltage regulation and higher efficiency, effecting a substantial savings in power. It will be understood that the invention is not necessarily limited to the conversion of such Thyratron units, although it is particularly advantageous in such use.

The illustrated system may be used for example in supplying eight amperes of current at 50 volts for charging a battery power supply unit 14 having negative and positive terminals 15 and 16. To supply charging current to the battery unit 14, a full wave rectifier is connected through a series current control circuit to the battery. In particular, the negative terminal 15 is connected through a cable 17 to an output terminal 18 of the unit 11. Terminal 18 is connected through a filter choke 19, an ammeter 20 and a fuse 21 to the center tap of a secondary winding 22 of a transformer 23 having a primary winding 24 connected to a suitable A.C. source such as a source of 60 cycle 120 volt current. The end terminals of the secondary winding 22 are connected to terminals 25 and 26 which are connected to terminals 27 and 28 of the conversion unit 12. Terminals 27 and 28 are connected through silicon diodes 29 and 30 to a circuit point 31 which is connected through a silicon controlled rectifier 32 and a resistor 33 to an output terminal 34 connected through a cable 35 to the positive terminal 16 of the battery unit 14.

There is thus provided a full wave rectifier circuit in which current is applied through the silicon controlled rectifier 32 during both half cycles of the A.C. supply voltage. The voltage and current applied to the battery unit are controlled by controlling the point at which the silicon controlled rectifier 32 fires in each half cycle of the A.C. supply voltage.

To apply firing or triggering control pulses to the silicon controlled rectifier 32, the gate electrode thereof is connected through a resistor 37 to one base electrode of a unijunction transistor 38 which is connected through a resistor 39 to a bus or line 40. Line 40 is connected through a line 41 of the unit 12 to an output terminal 42 which is connected through a wire 43 to the positive terminal of the battery, which may preferably be grounded as illustrated. The lines 40, 41 could be connected to the lower end of the resistor 33 within the unit 12, but the separate independent connection to the battery terminal is provided to obviate transient voltages produced by the heavy pulsating current flow through the conductors from the resistor 33 to the battery terminal.

To operate the unijunction transistor and develop triggering control pulses therefrom, positive pulses at a 120 cycle rate (assuming a 60 cycle supply) are clipped and applied in both the base and emitter circuits thereof. In particular, the second base electrode of the unijunction transistor 38 is connected through a resistor 45 to a circuit point 46 which is connected through a resistor 47 to the circuit point 31 and is also connected through a zener diode 48 to the ground line 40.

Voltage pulses at the 120 cycle rate and of substantially constant amplitude are thereby developed at the circuit point 46 and are applied through resistor 45 to the second base electrode of the unijunction transistor 38. Such pulses are also applied through a resistor 49 to the emitter of the unijunction transistor 38 which is connected through a capacitor 50 to the ground line 40 and is also connected to the collector of a control transistor 51.

In operation, the capacitor 50 has a relatively small charge at the beginning of each of the positive pulses developed at the 120 cycle rate at the circuit point 46 and is then charged up through the resistor 49 at a certain rate. This rate and also the initial condition of charge of the capacitor are controlled in part by the control transistor 51 in a manner as will be described. When the voltage of the emitter of the unijunction transistor 38 reaches a certain value, the unijunction transistor 38 conducts to discharge the capacitor 50 and to develop a positive triggering pulse across the resistor 39. This positive triggering pulse is applied through the resistor 37 to the gate electrode of the silicon controlled rectifier 32 to initiate conduction thereof. The silicon controlled rectifier 32 continues to conduct until the end of the half cycle is reached or approached, when the voltage across the transformer secondary 22 reverses in polarity. The average output voltage and average output current are of course controlled by the point in each half cycle when the triggering pulse is applied, being increased when the firing or triggering point is advanced and decreased when the triggering or firing point is retarded.

The triggering point is controlled by the transistor 51 which in turn is controlled in response to output voltage in a manner to maintain output voltage substantially constant, and is also controlled in response to output current above a certain value, to limit output current to a desired maximum value. In particular, the base of the transistor 51 is connected through a resistor 52 to the ground line 40 and the emitter of the transistor 51 is connected through a zener diode 53 to the movable contact of a potentiometer 54 which operates as a voltage sensing potentiometer. One end of the potentiometer 54, the upper end as illustrated, is connected to the collector of a transistor 55 having its emitter connected to the ground line 40. Transistor 55 operates in conjunction with an excess current sensing circuit and so far as concerns the voltage regulating operation, the transistor 55 may be assumed to be operated in a saturated condition, to present a substantially short circuit between the end of the potentiometer 54 and the ground line 40.

The other end of the potentiometer 54 (the lower end as illustrated) is connected through the resistor 56 to a terminal 57 which is connected through a conductor 58 to the negative terminal of the battery unit 14.

In operation, when the output voltage increases, the potential of the contact of the potentiometer 54 becomes more negative to cause the potential of the emitter of the transistor 51 to become more negative, to thereby increase the base-emitter current, which reduces the collector-emitter impedance of the transistor 51, the transistor 51 being operated as a grounded base amplifier. With the reduced impedance between the collector of the transistor 51 and the movable contact of the potentiometer 54, which is at a negative potential, the initial condition of charge of the capacitor 50 and its rate of charge are decreased so as to retard the triggering point and reduce the output voltage. The action is of course reversed when the output voltage decreases and thus a substantially constant value of output voltage is obtained. This value may of course be adjusted by adjustment of the voltage sensing potentiometer 54.

The transistor 55 is part of an output current limiting circuit. In particular, the base of the transistor 55 is connected through a resistor 60 to the terminal 57, through a stabistor diode 61 to the ground line 40, and in addition to a movable contact of a "current limiting" potentiometer 62 having one end connected through a resistor 63 to the ground line 40 and its other end connected through a capacitor 64 to the line 40 and through a resistor 65 to the cathode of the silicon controlled rectifier 32, thus effectively placing potentiometer 62 in parallel relation to the resistor 33. Resistor 33 may preferably have a value such as to produce a voltage drop of approximately 1 volt at maximum operating current.

In operation, a positive voltage is developed at the contact of the current limiting potentiometer 62 proportional to the voltage across the resistor 33 which in turn is proportional to output current, resistor 33 being a current sensing resistor. When output current is below a certain value, there is no effect on the transistor 55 which is normally operated in a saturated condition. However, when the potential of the contact of the current limiting potentiometer 62 reaches a certain value, the impedance of the transistor 55 is increased, thereby causing the potential of the contact of the voltage sensing potentiometer 54 to move in a negative direction, to retard the triggering point in the manner as described above. The maximum current can of course be adjusted by adjustment of the potentiometer 62.

An importhant feature of the circuit is in the provision of a diode 67, preferably a silicon diode, between the output terminal 34 and a terminal 68 of the unit 12, connected to a terminal 69 of the unit 11 which is connected to a point 70 at the junction between filter choke 19 and the ammeter 20. When the silicon controlled rectifier 32 stops conducting at or near the end of each one-half cycle, the collapsing current causes the production of an inverse voltage surge across the filter choke 19 with the point 70 being placed at a relatively high positive value. This voltage surge is applied through the diode 67 to the battery. In this way, damage to the choke 19 and other components is obviated, and a substantial increase in efficiency is obtained.

Another important feature of the invention is in the provision of a resistor 71 across the diode 67 which provides a holding current path for the silicon controlled rectifier 32 and maintains it in a conducting state after a firing or triggering pulse, until the forward impedance of the filter choke has been reduced by forward magnetizing current. This arrangement eliminates the need for high capacitance filter capacitors which would otherwise be required to stabilize the potential at the circuit point 70.

It will be understood that modifications and variations may be effected without departing from the spirit and scope of the novel concepts of this invention.

We claim as our invention:
1. In a rectifier circuit,
positive and negative output terminals, a silicon controlled rectifier having an anode, a cathode and a gate electrode,
means connecting said cathode to said positive output terminal,
a choke having one end thereof connected to said negative output terminal, coupling means for connecting the other end of said choke and said anode to a source of alternating current,
a unijunction transistor having an emitter electrode and first and second base electrodes,
first and second circuit points,
a zener diode connected between said first and second circuit points,
means connecting said first circuit point to said cathode,
means including a first resistor connecting said second circuit point to said anode to develop constant amplitude voltage pulses across said zener diode,
means respectively connecting said first and second base electrodes to said first and second circuit points,
a capacitor connected between said first circuit point and said emitter,
a second resistor connected between said emitter and said second circuit point to charge said capacitor and to cause periodic triggering of said unijunction transistor,
means in circuit with one of said base electrodes for applying triggering pulses from said unijunction transistor to said gate electrode to render said silicon controlled rectifier conductive, and a resistor electrically connecting said first circuit point to said other end of said choke to provide a current path for said silicon controlled rectifier during initial conduction thereof until the forward impedance of said choke is reduced by forward magnetizing current.
2. A battery charger comprising:
positive and negative output terminals arranged for connection to a battery;
a silicon controlled rectifier having an anode, a cathode and a gate electrode;
means connecting said cathode to said positive output terminal;
a choke having one end thereof connected to said negative output terminal;
coupling means for connecting the other end of said choke and said anode to a source of alternating current;
a unijunction transistor having an emitter electrode and first and second base electrodes;
a unijunction transistor having an emitter electrode and first and second base electrodes;
first and second circuit points;
a zener diode connected between said first and second circuit points;
means connecting said first circuit point to said cathode;
means including a first resistor connecting said second circuit point to said anode to develop constant amplitude voltage pulses across said zener diode;
means respectively connecting said first and second base electrodes to said first and second circuit points;
a capacitor connected between said first circuit point and said emitter;
a second resistor connected between said emitter and said second circuit point to charge said capacitor and to cause periodic triggering of said unijunction transistor;
means in circuit with one of said base electrodes for applying triggering pulses from said unijunction transistor to said gate electrode of said silicon controlled rectifier;
means connected between said emitter and said negative output terminal for controlling the triggering point of said unijunction transistor to maintain the output voltage substantially constant;
a resistor electrically connecting said first circuit point to said other end of said choke to provide a current path for said silicon controlled rectifier during initial conduction thereof until the forward impedance of said choke is reduced by forward magnetizing current;
means responsive to output current and connected to said emitter electrode for retarding triggering of said unijunction transistor when output current exceeds a certain value to limit output current; and a diode electrically connecting said first circuit point to said other end of said choke, whereby a period of conduction immediately followed by a period of non-conduction of said silicon controlled rectifier will cause an inverse voltage to be developed across said choke and the current developed thereby is applied through said diode to said battery.

3. In a rectifier circuit,
a load,
positive and negative output terminals connected to said load,
a silicon controlled rectifier having an anode, a cathode and a gate electrode,
means connecting said cathode to said positive output terminal,
a choke having one end thereof connected to said negative output terminal,
coupling means for connecting the other end of said choke and said anode to an A.C. source,
a unijunction transistor having an emitter electrode and first and second base electrodes,
first and second circuit points,
a zener diode connected between said first and second circuit points,
means connecting said first circuit point to said cathode,
means including a first resistor connecting said second circuit point to said anode to develop constant amplitude voltage pulses across said zener diode,
means respectively connecting said first and second base electrodes to said first and second circuit points,
a capacitor connected between said first circuit point and said emitter,
a second circuit point connected between said emitter and said second circuit point to charge said capacitor and to cause periodic triggering of said unijunction transistor,
means in circuit with one of said base electrodes for applying triggering pulses from said unijunction transistor to said gate electrode of said silicon controlled rectifier,
means connected between said emitter and said negative output terminal for controlling the triggering point of said unijunction transistor to maintain an output voltage substantially constant,
a diode electrically connecting said first circuit point to said other end of said choke,
whereby a period of non-conduction immediately following a period of conduction of said silicon controlled rectifier will cause an inverse voltage to be developed across said choke and the current developed thereby applied through said diode to said load, and
resistance means connected in parallel with said diode to provide a current path for said silicon controlled rectifier during initial conduction thereof until the forward impedance of said choke is reduced by forward magnetizing current.

References Cited by the Examiner
UNITED STATES PATENTS

| 3,025,534 | 6/1963 | Cockrell | 321—19 |
| 3,095,534 | 6/1963 | Cockrell | 321—19 |
| 3,119,058 | 1/1964 | Genuit. | |
| 3,146,392 | 8/1964 | Sylvan. | |
| 3,177,421 | 4/1965 | Montgomery | 321—47 |
| 3,195,029 | 7/1965 | Gilbreath. | |
| 3,221,241 | 11/1965 | Greenberg. | |

JOHN F. COUCH, *Primary Examiner.*

M. L. WACHTELL, *Assistant Examiner.*